(12) United States Patent
Bröer et al.

(10) Patent No.: US 6,247,303 B1
(45) Date of Patent: Jun. 19, 2001

(54) METHOD AND DEVICE FOR REMOVING OXIDIC NOXIOUS SUBSTANCES IN AN OXYGEN-CONTAINING EXHAUST GAS AND ENGINE WHICH IS OPERATED THEREWITH

(75) Inventors: Stefan Bröer, Wickede; Thomas Hammer, Hemhofen, both of (DE); Frank Witzel, Bloomfield Hills, MI (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/441,538

(22) Filed: Nov. 16, 1999

Related U.S. Application Data

(63) Continuation of application No. PCT/DE98/01296, filed on May 8, 1998.

(30) Foreign Application Priority Data

May 16, 1997 (DE) .............................................. 197 20 653

(51) Int. Cl.[7] ...................................................... F01N 3/00
(52) U.S. Cl. ................................ 60/274; 60/275; 60/286; 60/303
(58) Field of Search ............................ 60/275, 274, 286, 60/301, 303, 299

(56) References Cited

U.S. PATENT DOCUMENTS

| | | | | |
|---|---|---|---|---|
| 5,369,956 | * | 12/1994 | Daudel et al. | 60/276 |
| 5,410,873 | * | 5/1995 | Tashiro | 60/276 |
| 5,711,147 | * | 1/1998 | Vogtlin et al. | 60/274 |
| 5,746,984 | * | 5/1998 | Hoard | 422/169 |
| 5,845,487 | * | 12/1998 | Fraenkle et al. | 60/274 |
| 5,891,409 | * | 4/1999 | Hsiao et al. | 423/239.1 |
| 6,026,640 | * | 2/2000 | Kato et al. | 60/274 |

* cited by examiner

*Primary Examiner*—Thomas Denion
*Assistant Examiner*—Binh Tran
(74) *Attorney, Agent, or Firm*—Herbert L. Lerner; Laurence A. Greenberg; Werner H. Stemer

(57) ABSTRACT

To clean the exhaust gas of internal-combustion engines or other machines which are operated with fossil fuel, it is proposed to firstly pretreat the exhaust gas in a non-thermal normal-pressure gas discharge and subsequently allow a selective catalytic reduction of oxidic noxious substances to take place with the addition of a suitable reduction substance, or to allow a selective catalytic decomposition to take place. The device for removing the oxidic noxious substances is characterized by a series circuit of at least one module with a gas discharge section and at least one module with a catalytic-converter section, and is suitable in particular for use in a diesel engine.

27 Claims, 9 Drawing Sheets

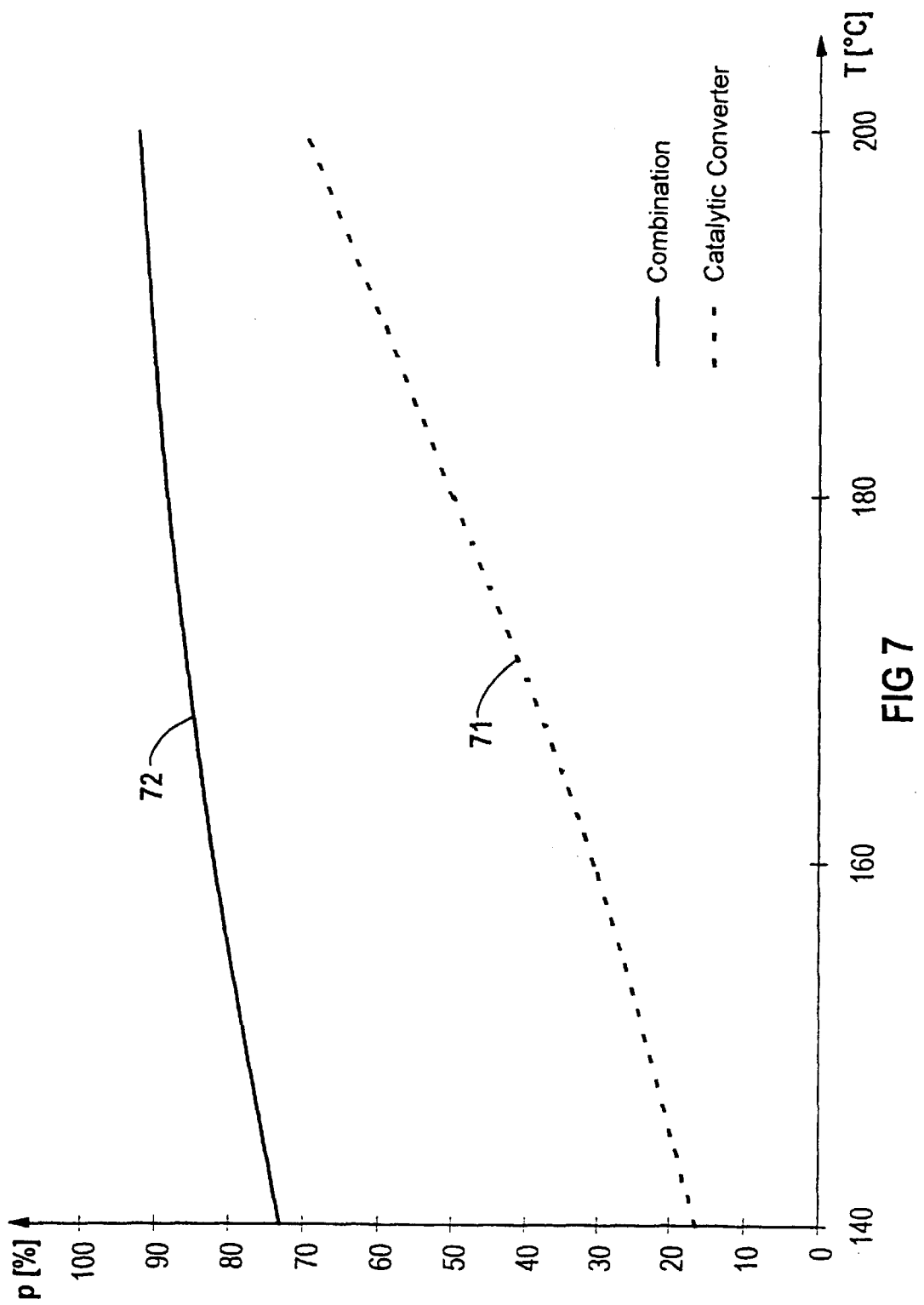

METHOD AND DEVICE FOR REMOVING OXIDIC NOXIOUS SUBSTANCES IN AN OXYGEN-CONTAINING EXHAUST GAS AND ENGINE WHICH IS OPERATED THEREWITH

CROSS-REFERENCE TO RELATED APPLICATION

This is a continuation of copending International Application PCT/DE98/01296, filed May 8, 1998, which designated the United States.

BACKGROUND OF THE INVENTION

Field of the Invention

The invention relates to methods for removing oxidic noxious substances in an oxygen-containing exhaust gas, in particular to clean the exhaust gas of an internal combustion engine or of another machine which is operated with fossil fuel, such as a diesel engine. The invention also relates to a device for carrying out the methods and to an engine that is operated with the specified methods and the associated device.

Exhaust gases from combustion processes constitute one of the main sources of atmospheric pollutants. These include, in particular, nitrogen oxides, sulfur dioxides, hydrocarbons, carbon monoxide, soot or the like. The three-way catalytic converter, which effectively eliminates nitrogen oxides, hydrocarbons and carbon monoxide, is the state of the art specifically for a spark-ignition engine which operates with an excess air factor $\Lambda=1$. The catalytic converter is suitable for a diesel engine or a lean-mix spark-ignition engine ($\Lambda>1$) to only a limited degree because only the hydrocarbons and carbon monoxide are largely decomposed, but the nitrogen oxides cannot be reduced owing to the high oxygen content in the exhaust gas. Until now there has not been any type of catalytic converter with a sufficiently high noxious-substance decomposition rate and service life for these types of engines.

Various approaches to eliminating the noxious substances in the exhaust gases of diesel engines or lean-mix.spark-ignition engines are known from the prior art. In this respect, the so-called selective catalytic reduction (SCR=selective catalytic reduction) of nitrogen oxides is becoming increasingly significant.

For direct-injecting (DI) spark-ignition engines which are operated with a lean mix under partial load, i.e. with an air excess factor ($\Lambda>1$), but with $\Lambda=1$ under full load, hydrocarbons (HC=hydrocarbons) are the reduction substances in discussion, which, however, have to be added in excess according to the prior art in order to achieve effective reduction (see for example A. Fritz, V. Pitchon: "The Current State of Research on Automotive Lean NOx Catalysis", Applied Catalysis B: Environmental, Vol. 13, pages 1–25 (1997)). The reason for this is that the hydrocarbons are also oxidized catalytically by the oxygen contained in the exhaust gas. This process becomes more probable as the temperature rises and thus sets an upper temperature limit of, for example, 550° C. for the use of the HC-SCR catalytic converters. The lower limit is given by the use of No reduction and, depending on the material of the catalytic converter, is 300° C. and above. A further concept for DI spark-ignition engines is associated with the term "NOx Storage Catalytic Converters" (see for example Automotive Engineering, Vol. 105, issue 2, pages 133–135 (1997)). Here, the nitrogen oxides are stored during lean operation and catalytically reduced in cyclically occurring short phases with extremely rich operation, and thus with a high emission of hydrocarbons. The hydrocarbons are not used efficiently according to this prior art either.

In diesel vehicles, the principle involved makes rich operation impossible from the outset. For this reason, the reduction substance used here is ammonia that is made available to the SCR process by a urea hydrolysis (ammonia SCR and urea SCR). This avoids a situation in which, in particular for mobile use, it is necessary for the user to carry ammonia directly with him. In practice, in mobile use, reduction rates of nitrogen oxides of more than 70% are achieved. A peculiarity of this method is that urea has to be carried along in a supplementary tank in the vehicle. This method operates at temperature intervals of approximately 200° C. to a maximum of 550° C.

Generally, it can therefore be claimed that SCR methods experience problems in the warm-up phase of engines and during low-load operation, for example in the town cycle, but also under full-load conditions with exhaust-gas temperatures of over 600° C. in some cases.

By use of plasma-chemical methods and associated devices, as are described in Published, Non-Prosecuted German Patent Applications DE 42 31 581 and DE 44 16 676 A, International Patent Disclosure WO 97/03746 A and U.S. Pat. No. 5,476,539, it is also possible to reduce the nitrogen oxides from engine exhaust gases. Here, so-called non-thermal normal-pressure gas discharges are used to initiate chemical reactions in a plasma which can lead to decomposition of the nitrogen oxides.

"Non-thermal normal-pressure gas discharges" are generally understood as gas discharges that burn under normal pressure and in which high-energy electrons initiate plasma processes without the gas being significantly heated in the process. These include dielectrically impeded ("silent") discharges, corona discharges and pulsed glow discharges (see for example B. Eliasson, U. Kogelschatz: "Nonequilibrium Volume Plasma Chemical Processing", IEEE Trans. Plasma Sci. Vol. 19, No. 6, pages 1063–1077 (1991)). A peculiarity of these plasma-chemical methods is that they oxidize the nitrogen oxides mainly to form $NO_2$ and $HNO_3$ and only reduce them to the desired products $N_2$ and $O_2$ to a small degree and with comparatively high expenditure of energy. The combination, proposed in U.S. Pat. No. 3,983,021 and in Published, European Patent Application EP 0 659 465 A2, of a gas discharge and a catalytic converter in direct contact has also previously not been successful. This is due, inter alia, to the fact that a series of catalytic converters cannot be used as the dielectric because in the presence of certain exhaust-gas components, for example heavy hydrocarbons, they form a weak electrical conductivity which, in particular, impedes or entirely prevents the operation of the silent discharges. Furthermore, the document does not provide for the addition of a reduction substance or even excludes it as unsuitable for cleaning the exhaust gases of motor vehicles. A concrete approach for effective cleaning of exhaust gas specifically at low exhaust-gas temperatures is not given in the publication.

In addition, Published, Non-Prosecuted German Patent Application DE 195 10 804 A describes a method for reducing the nitrogen oxide in exhaust gases of internal combustion engines, in which the exhaust gases having excess oxygen are placed in contact with a catalyst while a selectively acting gaseous reduction substance is added. In the associated device, before entering into contact with the catalyst the reduction substance is converted into the high-pressure plasma state with an overwhelming formation of radicals. In contrast, in Published, European Patent Application EP 0 585 047 A, in order to clean the exhaust gases of internal combustion engines, the exhaust gas firstly passes through an electrical low-temperature discharge before it arrives at a converter with a catalyst for converting the noxious substances. Reduction is not mentioned in this reference.

Furthermore, in Published, Non-Prosecuted German Patent Application DE 21 26 228 A a method and a device for cleaning exhaust gas in motor vehicles is described, in which the exhaust gas is firstly fed to an electrostatic filter before it is conducted through a catalytic exhaust-gas reactor. The filter is intended to charge particles floating in the spatial discharge field of a corona discharge. A gas discharge is not realized here. Finally, in order to remove NOx from an exhaust gas, Published Japanese Abstract JP 63-242323 A proposes treatment using a discharge plasma before the exhaust gas is conducted with reducing effect through a catalyst bed based on platinum rhodium (PtRh).

SUMMARY OF THE INVENTION

It is accordingly an object of the invention to provide a method and a device for removing oxidic noxious substances in an oxygen-containing exhaust gas and an engine which is operated therewith which overcomes the above-mentioned disadvantages of the prior art methods and devices of this general type.

With the foregoing and other objects in view there is provided, in accordance with the invention, a method for removing oxidic noxious substances in an exhaust gas containing oxygen, which includes:

pretreating, initially, the exhaust gas containing the oxidic noxious substances including nitrogen monoxide in a non-thermal normal-pressure gas discharge in which the nitrogen monoxide is oxidized forming nitrogen dioxide and a degree of oxidation of the nitrogen monoxide to form the nitrogen dioxide being held below 50%; and performing, subsequently, a selective catalytic reduction of the oxidic noxious substances with an addition of ammonia functioning as a reduction substance and resulting in water and nitrogen as reaction by-products.

Taking the prior art as a point of departure, the object of the invention is to specify methods for removing oxidic noxious substances in an oxygen-containing exhaust gas and to provide associated devices in which, in particular, the respective disadvantages of the plasma-chemical methods and of the catalytic methods for the treatment of exhaust gas are avoided. The intention is instead to utilize the strengths of both methods.

In the invention, a reactor for operating non-thermal normal-pressure gas discharges, also referred to below for short as "gas discharge", such as dielectrically impeded discharges, pulsed discharges or D.C. corona discharges or pulsed glow discharges, and a catalytic converter are connected in series in the direction of flow of the exhaust gas. In contrast to Published, European Patent Application EP 659 465 A2, there is no direct contact here between the plasma and the catalyst. Likewise in contrast to the European Patent Application EP 0 659 465 A2, there is provision for the reduction substance to be added either upstream of the gas discharge or upstream of the catalytic converter because of the preferred use of the invention for the reduction of NO in an oxidizing atmosphere, such as in diesel exhaust gas, for example. However, the use of the invention is not restricted by this to diesel exhaust gases but rather permits the efficient reduction of oxidic noxious substances, such as nitrogen oxide (NO) or nitrogen dioxide ($NO_2$), i.e. generally nitrogen oxides (NOx), in all oxidizing atmospheres.

In the case of the invention, the pretreatment of the exhaust gas in the gas discharge serves to "activates" the selective catalytic reduction. The latter has been used successfully for years for cleaning the smoke emissions from power plants. Within the scope of the invention, it is possible, for example, firstly to oxidize, induced by the gas discharge, some of the NO to form $NO_2$, which is possible by a suitable reactor configuration and reactor operation, for example in accordance with Published, Non-Prosecuted German Patent Applications DE 195 25 749 A1 or DE 195 25 754 A1, with a low expenditure of energy, the remaining NO being subsequently reduced together with the nitrogen dioxide.

The invention has been based on the surprising finding that the NO oxidation product $NO_2$, which is actually undesired, is actually decomposed in the selective catalytic reduction not only very much quicker, and particularly at lower temperatures than NO, but that it also makes possible the decomposition of NO at temperatures below the temperatures which are otherwise necessary for it. $H_2O$ and $N_2$ are to be expected as reaction products of the selective catalytic reduction of NO and $NO_2$ with $NH_3$ as the reduction substance. In order to promote the common reduction of NO and $NO_2$ and to avoid the formation of ammonium nitrate, which takes place in a reaction of $NO_2$ with $NH_3$ which is shorter in comparison, the conversion degree here will advantageously always lie below 50% of the initial NO content.

The expenditure of energy for the oxidation of NO to form $NO_2$ by the gas discharge can be reduced not only by reactor measures but also by providing in the exhaust gas hydrocarbons in a concentration which corresponds approximately to that of NO. This can be carried out by controlling the combustion process or by subsequent injection into the hot exhaust gas. The hydrocarbon in this case can be an individual hydrocarbon that preferably contains double bonds or oxygen, or there may be a mixture of different hydrocarbons, such as gasoline or diesel fuel.

The average energy consumption can be kept low within the scope of the invention by virtue of the fact that the gas discharge is controlled by a characteristic diagram as a function of the engine load and rotational speed as well as of the mean temperature of the catalytic converter. Discharge operation is not necessary above the threshold temperature for the selective catalytic reduction of NO, and below this temperature the use of energy per mass unit NOx in the exhaust gas rises as the temperature drops because more NO has to be converted to $NO_2$ at a constant degree of reduction.

In the event that the reduction substance is added before the gas discharge, it is to be noted during the gas discharge operation that the reduction substance is not decomposed by the gas discharge but instead is only activated. If this is ensured, within the scope of the invention advantages can be obtained in comparison with other proposals. An oxidation catalytic converter would indeed be capable of oxidizing, to a limited degree, NO to form $NO_2$, particularly at relatively high temperatures, but the reduction substances which are necessary in a downstream SCR catalytic converter, for example the hydrocarbons and CO contained in the exhaust gas, are virtually completely removed from the exhaust gas in the process, and the degree of conversion of NO to $NO_2$ disadvantageously rises as the temperature increases. Therefore, particularly for the activation of the reduction substance, gas discharge in particular provides possibilities which it has not been possible to realize until now using catalytic measures alone.

The activation therefore advantageously leads to a lower threshold temperature for the catalytic process than is usually necessary without gas discharge. The essential factor in this context is that the activation of the noxious substances, of the reduction substance or of other components of the exhaust gas in the gas discharge is possible in a temperature range which goes far beyond that for selective catalytic reduction. This provides the possibility of allowing the exhaust gas to cool before the catalytic treatment, that is to say, for example, in the gas discharge, and thus to extend additionally the range of application for catalytic reduction. Because the heat loss at high temperatures is significantly greater than at low temperatures, hot exhaust gas, which could damage the catalytic converter, or in which reduction is no longer possible because of catalytic oxidation of the reduction substance, is cooled more strongly than exhaust gas whose temperature is only a little above the threshold temperature for the catalytic process.

A further advantage of the invention lies in the fact that the provision of additional reaction ducts such as those mentioned above brings about increased reduction rates even in the temperature interval of a normal catalytic activity. These increased reduction rates do not become apparent with normal configuration for a maximum degree of reduction in the active temperature interval, but they permit the volume of the catalytic converter to be reduced for the same mass flow of exhaust gas or for a larger mass flow of exhaust gas to be treated with the same volume of catalytic converter.

Other features which are considered as characteristic for the invention are set forth in the appended claims.

Although the invention is illustrated and described herein as embodied in a method and a device for removing oxidic noxious substances in an oxygen-containing exhaust gas and an engine which is operated therewith, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 7 to 10 are graphs illustrating trial results for clarifying the invention.

DESCRIPTION OF THE PREFERRED EMBODIMENTS

Figure 1:
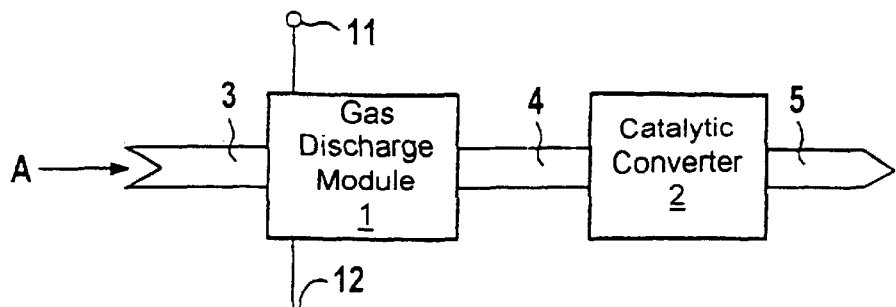
FIG. 1 is a diagrammatic, block diagram of a principle of a method for removing oxidic noxious substances in an oxygen-containing exhaust gas according to the invention.

In all the figures of the drawing, sub-features and integral parts that correspond to one another bear the same reference symbol in each case. Referring now to the figures of the drawing in detail and first, particularly, to FIG. 1 thereof, there is shown a simple series circuit of individual functional modules for cleaning an exhaust gas A. The exhaust gas A is conducted through a feed line 3 into a module 1 which contains a gas discharge section and ports 11 and 12 for supplying the gas discharge section 1 with electricity. After an activation, the exhaust gas A is passed through a connection line 4 into a module 2 that contains an SCR catalytic converter 2. After catalytic cleaning, the exhaust gas A is released through a line 5, or an exhaust system of a vehicle, leading into the open air.

Figure 2:
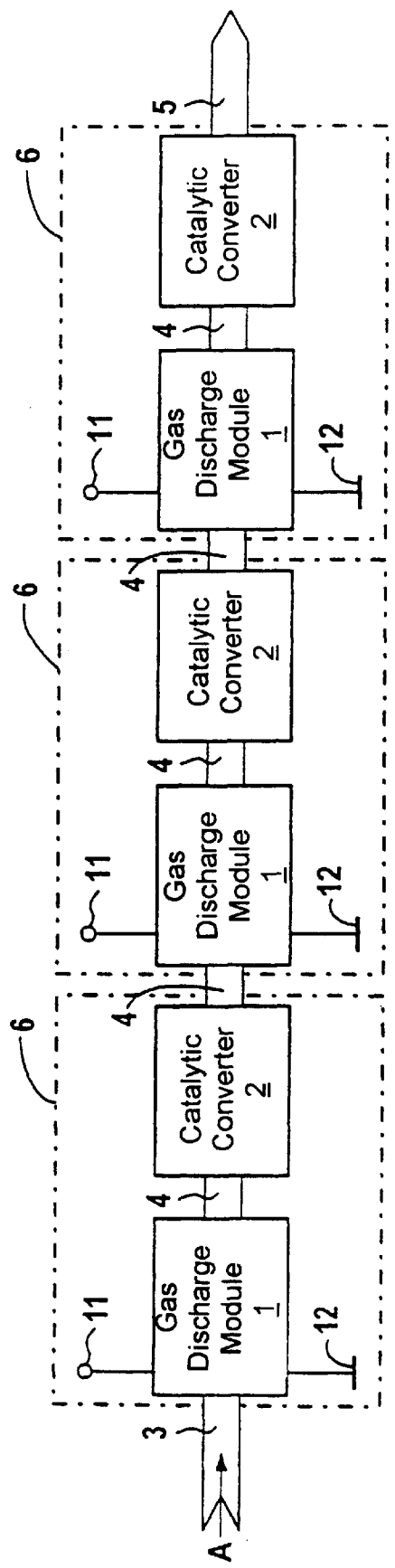
FIG. 2 is a block diagram of a modification of FIG. 1.
Figure 6:
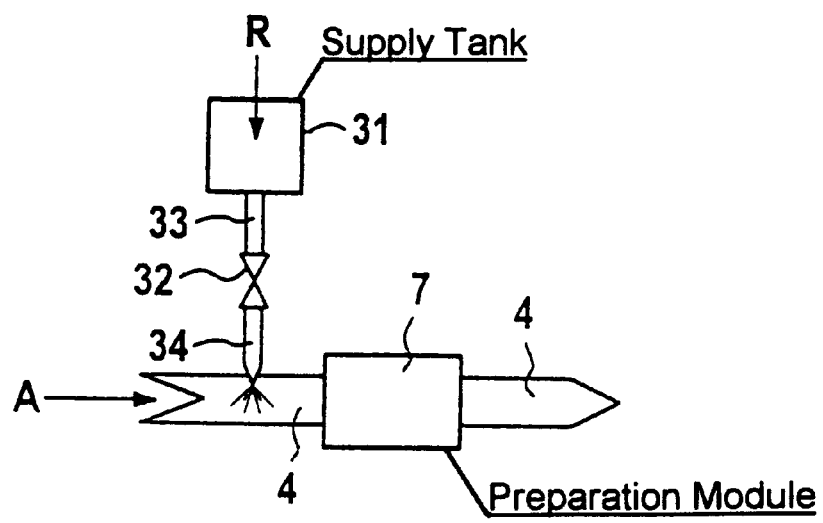

In FIG. 2, a plurality of the individual modules 1, 2 each having one of the gas discharge sections and a catalytic converter section alternately one behind the other are provided to increase the efficiency. In this way, a plurality of units 6 each made of the gas discharge module 1 and of the catalytic converter module 2 with the necessary connecting lines 4 are provided in a series circuit.

Figure 3:
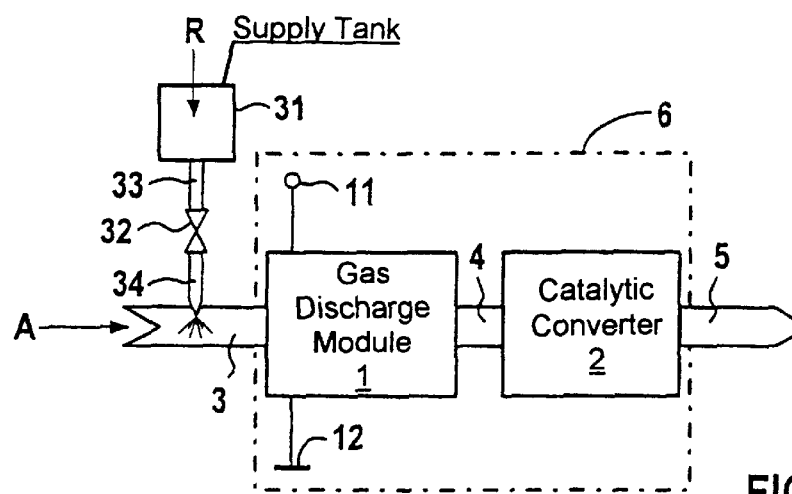
FIGS. 3 and 4 are block diagrams of possible ways of preparing the exhaust gas.

A first possible way of preparing the exhaust gas A is provided in FIG. 3. The efficiency of the method, whose principle is clarified with reference to FIGS. 1 and 2, is improved in a way which is compatible with practical conditions, by adding in a metered fashion a reduction substance R from a supply tank 31, a metering valve 32, feed lines 33 and a suitably configured probe 34 disposed upstream of the gas discharge module 1. The type of the probe 34 for conduction into the stream of the exhaust gas A depends on the method of preparation of the reduction substance R, which may be liquid or gaseous. In the configuration according to FIG. 2, the addition of the reduction substance R upstream of each gas discharge module 1 may be controlled separately.

Figure 4:
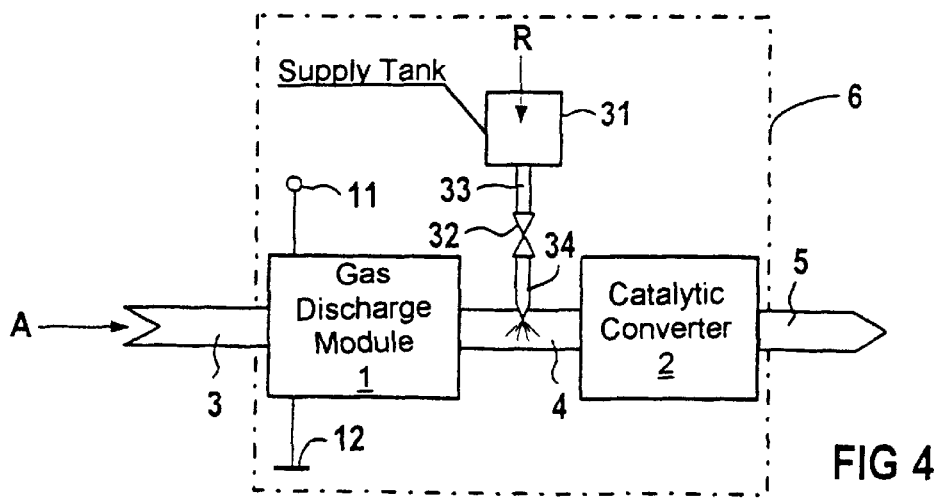

In FIG. 4, an alternative possible way of preparing the exhaust gas is provided. Here, the reduction substance R is added between the gas discharge module 1 and the catalytic converter module 2. When it is implemented in the configuration according to FIG. 2 with a series circuit of a plurality of units which are respectively composed of the gas discharge section and the catalytic converter section, the addition of the reduction substance R can be carried out in each unit 6 in a separately controlled way.

Figure 5:
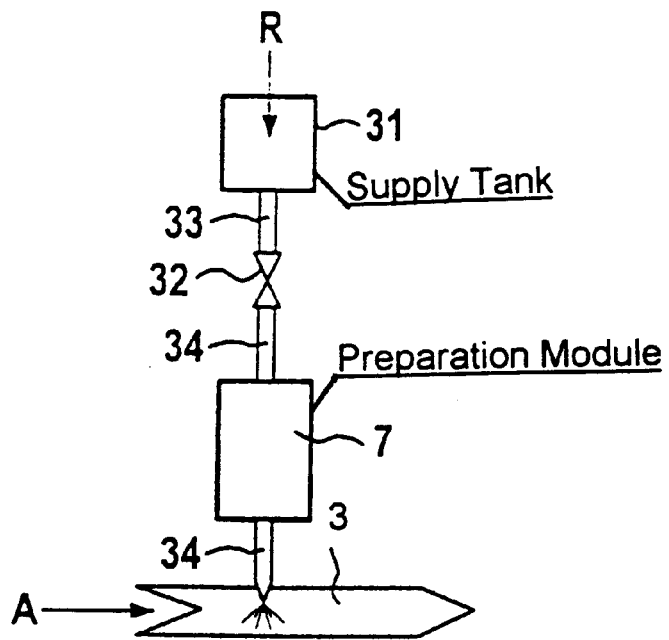
FIGS. 5, 5a, 5b and 6 are block diagrams for preparing a reduction substance.
Figure 5A:
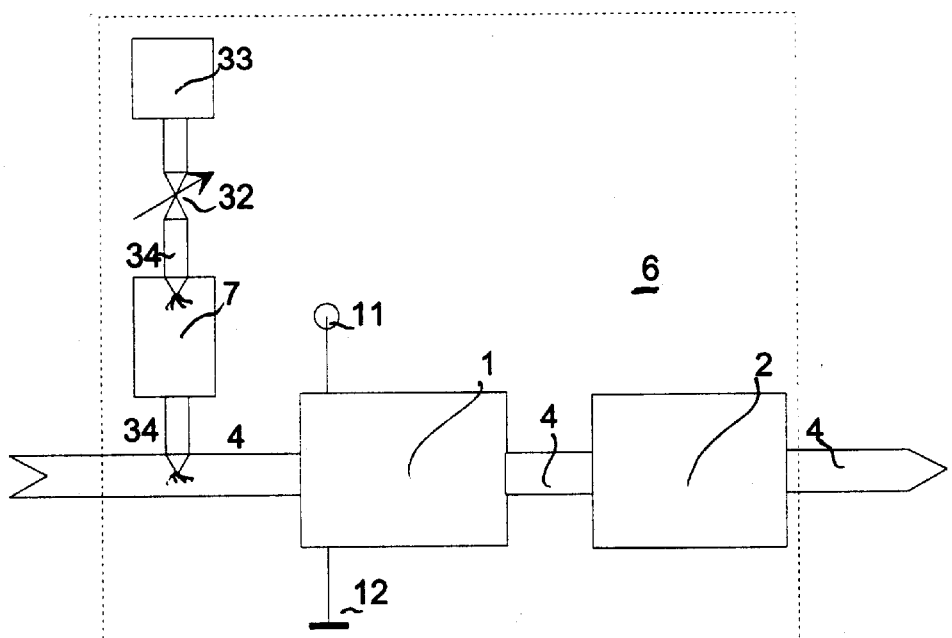
Figure 5B:
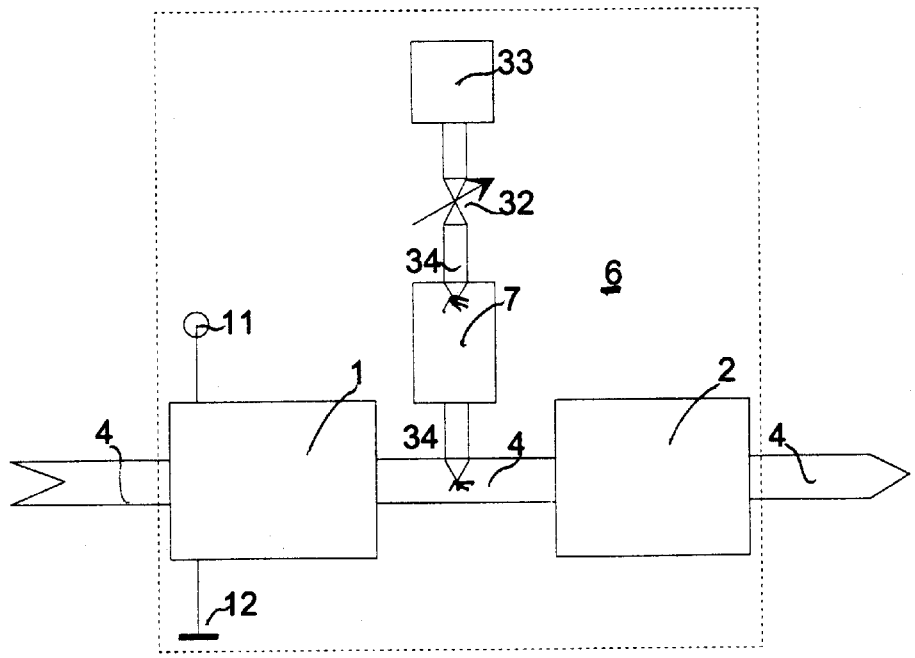

FIGS. 5, 5a, 5b and 6 show possible ways of preparing the reduction substance R, a preparation module 7 being provided for this in each case. Specifically in FIG. 5, the preparation takes place in the feed line 3 for the exhaust gas A. In FIG. 5a, a further catalytic converter is disposed downstream while in FIG. 5b a further catalytic converter is disposed upstream. The preparation module 7 may contain a catalytic converter section or a gas discharge section in this case. On the other hand, in FIG. 6 the preparation takes place in the exhaust-gas line 4.

FIG. 7 shows the degree p of NO reduction in % as a function of the exhaust-gas temperature T in ° C., ammonia being used as the reduction substance and a simple combination of the gas discharge module 1 and the SCR catalytic converter module 2 according to FIG. 1 having been used. The gas mixture which is treated as exhaust gas A was composed of 82% $N_2$, 13% $O_2$, 5% $H_2O$, 500 ppm NO and 500 ppm $NH_3$. The space velocity in the catalytic converter module 2 was 11,000 $h^{-1}$. The reduction substance R was added upstream of the gas discharge module 1. The curve 71 represents a trial result with a catalytic converter, and the curve 72 represents the trial result of a combination of the gas discharge section 1 and the catalytic converter 2 section.

Figure 8:
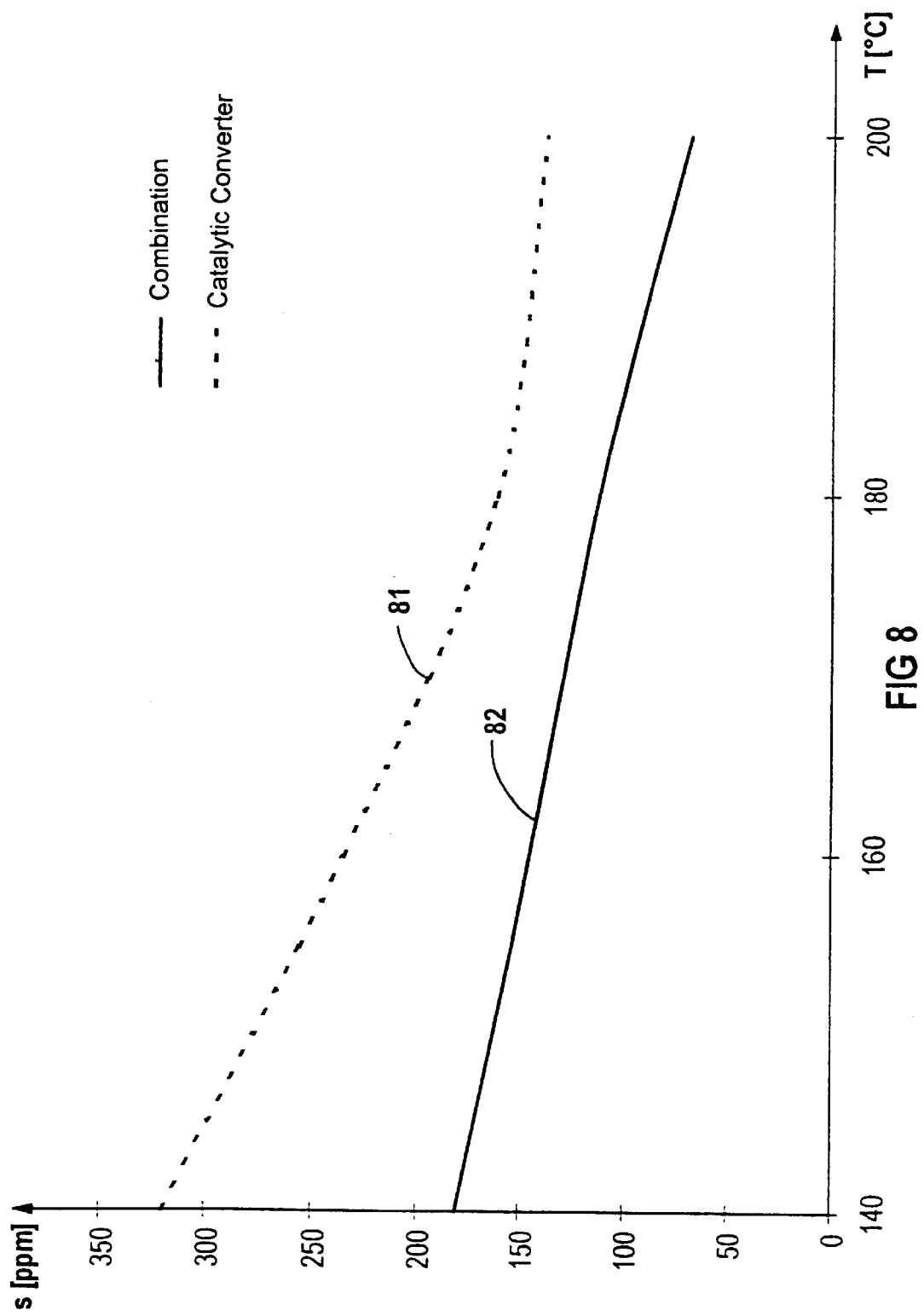

FIG. 8 shows an ammonia slips occurring during the processes according to FIG. 7, in ppm as a function of temperature T in ° C. The "slip" s is understood here to be the proportion of reduction substance that is not consumed, which provides a measure of the efficiency. Since the quantity of reduction substance is generally adapted to consumption, in practice the objective is to have a low slip. The curve 81 represents the trial result with only the catalytic converter, the curve 82 the trial result of a combination of the gas discharge and the catalytic converter.

Figure 9:
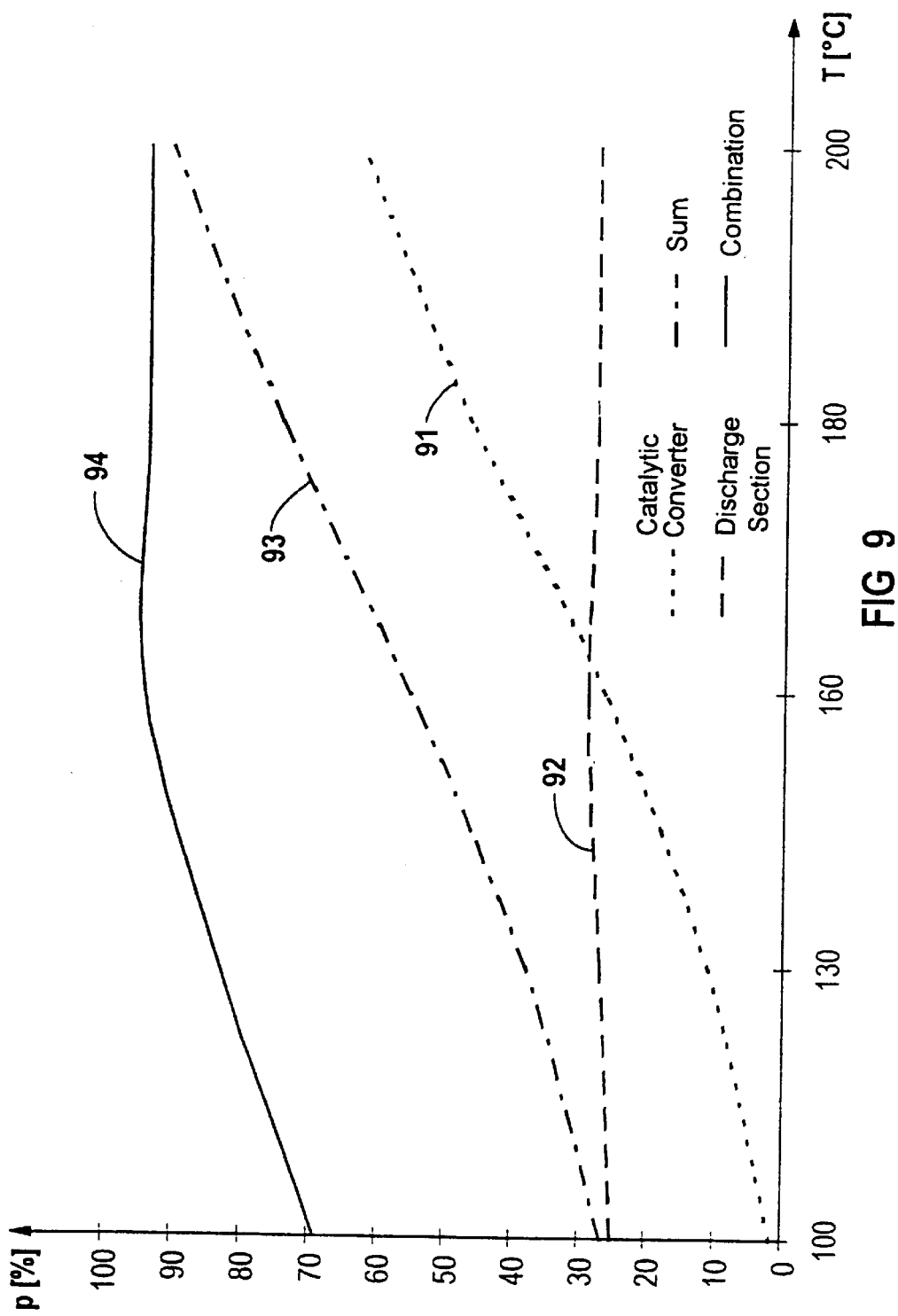
Figure 10:
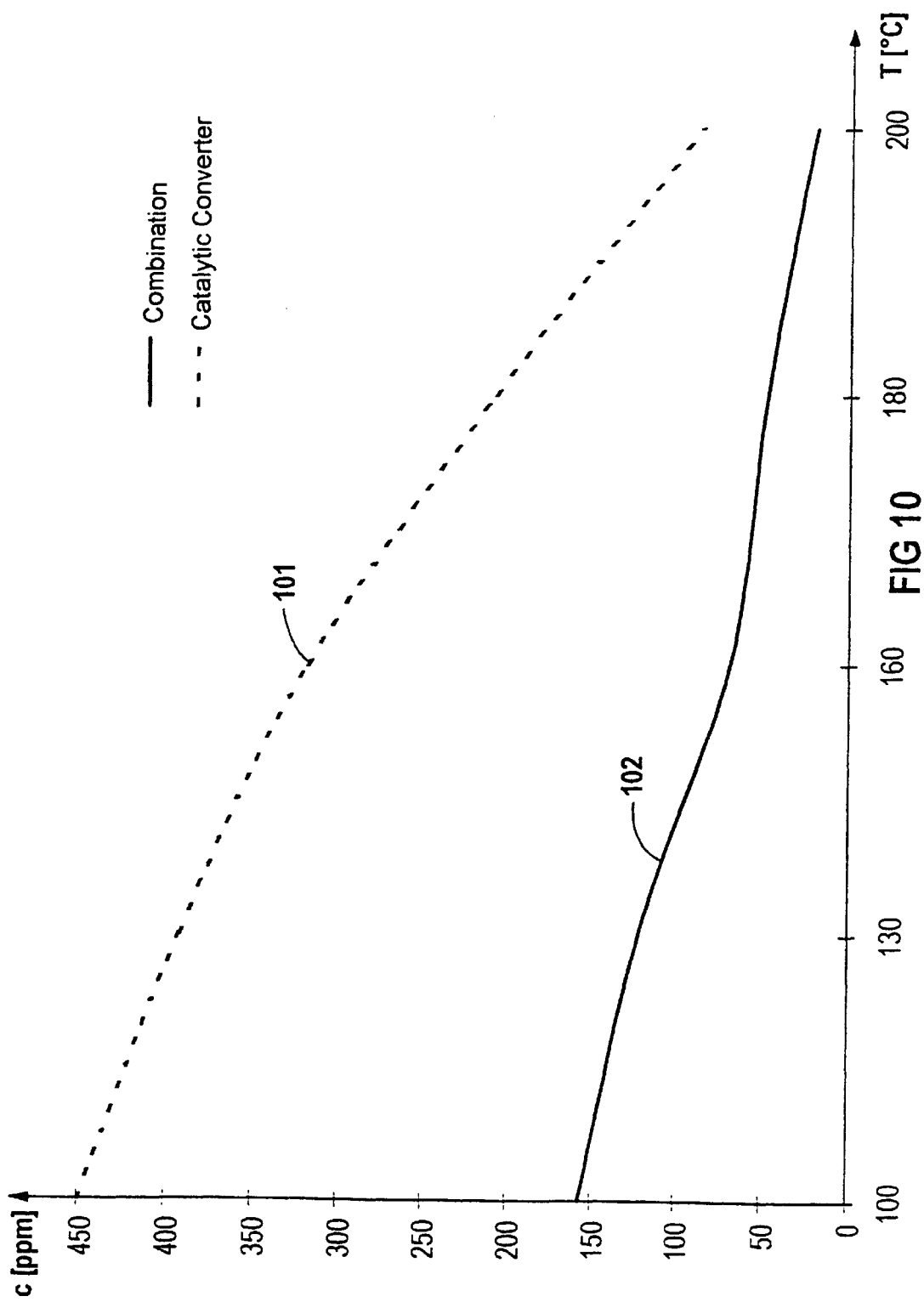

In a corresponding way, FIG. 9 illustrates the NOx reduction degree p and FIG. 10 illustrates the $NH_3$ concentration c in ppm as a function of the exhaust-gas temperature T in ° C. under the same peripheral conditions as in FIG. 7, but with a further addition of 500 ppm of the hydrocarbon ethene. Here, the curves 91 and 92 represent the results with the catalytic converter and the discharge section, respectively, while curve 93 shows their sum and curve 94 finally shows the combination of the gas discharge section 1 and the catalytic converter 2 for the proposed method of operation.

With the configuration described with reference to FIGS. 1 to 6, a catalytic converter from the field of power plant nitrogen removal, which uses $NH_3$ as the reduction substance, can be utilized. Furthermore, it is possible to use catalytic converters that reduce nitrogen oxides on the basis of selective catalytic reduction (SCR) with any desired reduction substance. In almost all cases, this process will run more efficiently and at relatively low temperatures if the exhaust gas is firstly activated by an energy-efficient gas-discharge process for catalytic cleaning.

The reduction substance used is specifically ammonia ($NH_3$). If appropriate, such substances which have previously not been used for NO reduction, but which are suitable for $NO_2$ reduction or for NO reduction in the presence of $NO_2$, are possible. The reduction substance R can be introduced either upstream of the gas discharge or else downstream of the gas discharge. Introduction upstream of the gas discharge module 1 leads not only to the formation of $NO_2$ but also to activation of the reduction substance by the gas discharge. It is also possible to pretreat the reduction substance R in a catalytic converter connected upstream of the gas discharge module, either in the feed line of the reduction substance or after the addition of the reduction substance R in the exhaust-gas line, as takes place, for example, in urea hydrolysis.

The presently mentioned aspects are covered by experimental results which have been carried out with a simple series connection of dielectrically impeded discharge and SCR catalytic converter: with these measurements, a catalytic converter from the field of power plant nitrogen removal was utilized and the reduction substance used was ammonia.

The measurement curves of the method according to the invention are plotted in FIGS. 7 to 10 as a function of the temperature T in comparison with known curves of catalytic converters and a separate normal-pressure discharge. In all cases there is a significant improvement.

In particular, it emerges from FIG. 7, through the comparison of curve 72 and curve 71, that at the predefined space velocity of approximately 11,000 $h^{-1}$ the degree p of reduction of the nitrogen oxides at a temperature T of 200° C. is increased from 70% to 92%, and at a temperature T of 180° C. from 50% to 88%. Even at 140° C. and 160° C., i.e. outside the known active temperature window (170° C.–430° C.) of the catalyst, the gas discharge module 1 which is connected upstream brings about a degree p of reduction of 72% or 81%. When the temperature is raised to 250° C., 90% of the nitrogen oxides are reduced even without the discharge module. By connecting the discharge module 1, the degree of reduction is increased to 95%.

From FIG. 8 it is apparent that the combination of the discharge section 1 and the catalytic converter section 2 according to curve 82 significantly reduces the ammonia slip in comparison with the exclusive treatment by the catalytic converter module according to curve 81. An increase in the degree of efficiency of the SCR method is therefore obtained.

The admixture of the hydrocarbon ethene, which in terms of its plasma-chemical behavior has a model character for the hydrocarbons present, for example, in diesel exhaust gases, to the existing mixture of exhaust gases produces a further increase in the degree p of reduction in the combination of discharge plasma and catalytic converter module so that the oxidation of NO to form $NO_2$ in the gas discharge runs more efficiently. In this regard, FIG. 9 shows the curve 91 for a catalytic converter and the curve 92 for the decomposition reaction of a discharge. The degree p of reduction of the catalytic converter rises from 1% to 63% as the working temperature is increased from 100° C. to 200° C. Without a downstream catalytic converter, i.e. with the gas discharge section alone, the degree p of reduction is low and is approximately 25% irrespective of the temperature T.

It is apparent from curve 94 that here with a low expenditure of energy for the temperatures 100° C. and 130° C. the degree of reduction for NO of 1% and 11% for the catalytic converter can be increased to 69% and 83%, solely by the combination of the gas discharge module 1 and the catalytic converter 2. At the given temperatures T of 160° C., 180° C. and 200° C., it is possible to discern an improvement in the degree p of reduction from 27%, 47% and 63%, respectively, to 95% in each case. Here, the ammonia slip s is also reduced, which is clear in particular from FIG. 10. The $NH_3$ concentration p, illustrated in FIG. 10 on the ordinate, in ppm corresponds to the slip according to FIG. 7, the curve 101 representing the trial results with a catalytic converter, and the curve 102 representing the trial results of a combination of discharge module and catalytic converter.

As in the case of the experiments without the model hydrocarbon ethene, it is also clear from FIG. 10 that the combination of the discharge module 1 and the catalytic converter 2 according to curve 102 significantly reduces the ammonia slip s in comparison with an exclusive treatment by the catalytic converter according to curve 101. This also shows the increase in the degree of efficiency with the proposed method in comparison with the prior art.

The compositions selected for the investigations described above using model exhaust gases correspond to the basic composition of diesel exhaust gas when a diesel engine is operating with an average load. In this respect the results can be transferred, the application of the method described and of the associated device for diesel engines producing a considerable improvement in comparison with the relevant prior art. The expenditure which it requires stays within reasonable limits.

Figure 11:
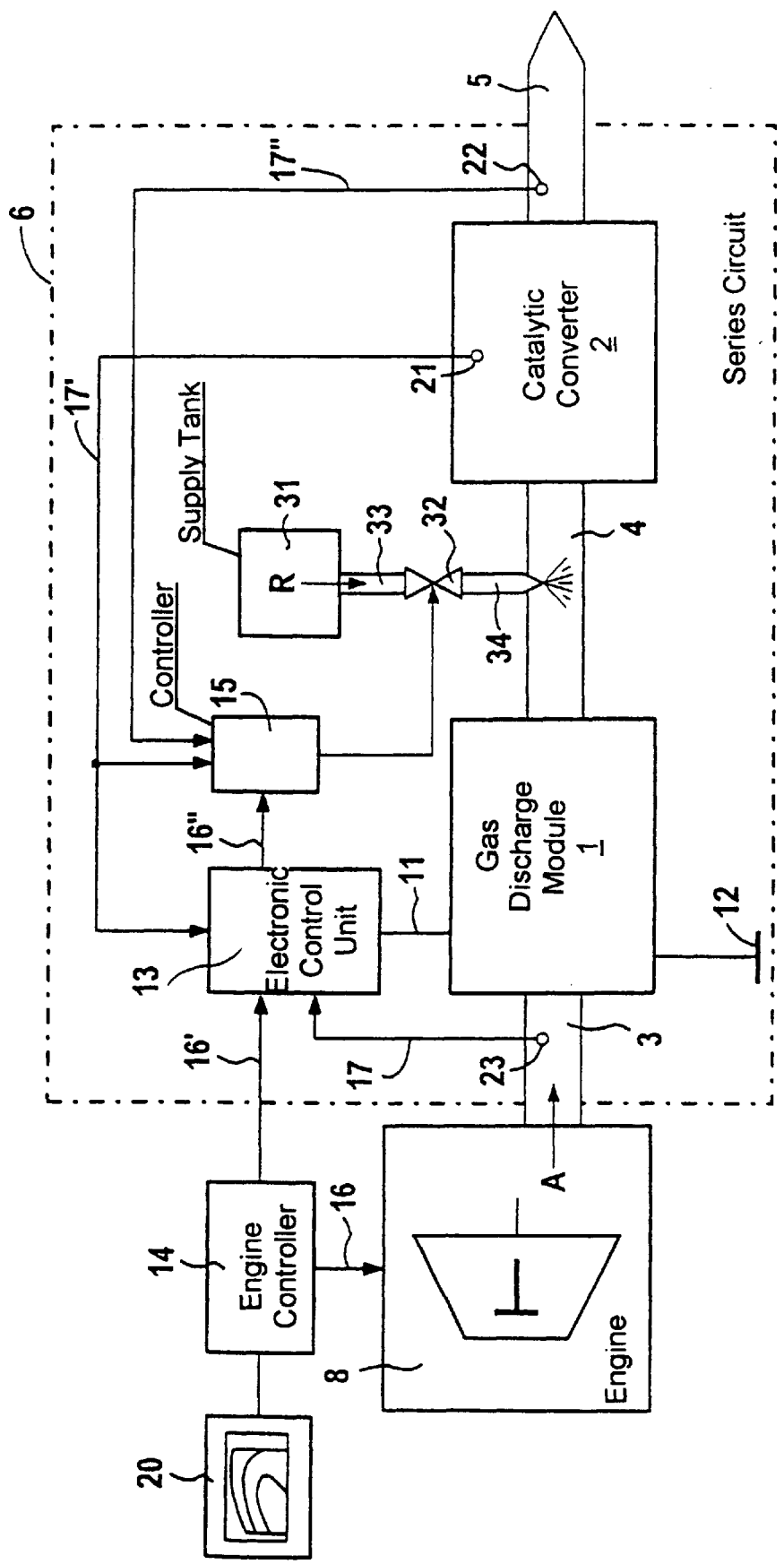
FIG. 11 is a block diagram of an engine operated with the method described.

FIG. 11 illustrates the specific implementation of the method described and of the associated device specifically in the case of a diesel engine.

An engine 8 with a device according to FIG. 1 formed of the combination of the modules 1 and 2 having the gas discharge section 1 and the catalytic converter section 2, respectfully, are assigned an electronic control unit 13 with an associated switched-mode power supply for operating the gas discharge, and a unit 14 for controlling the engine 8. An electronic controller 15 for controlling an injection of the reduction substance R, for example urea, is provided along with data lines 16, 16', 16" for digital and/or analog signals for the control functions. Reference numerals 17, 17' and 17" designate signal lines for measurement signals.

The gas discharge in the exhaust gas A and the feeding in of the reduction substance R are controlled as a function of the state of the engine B. A permanent data memory 20, for example an EEPROM, in which known characteristic diagrams KF of the engine 8 are stored is connected upstream of the motor control unit 14. Furthermore, there are measurement devices for characteristic variables. These include a sensor 21 for an electrical temperature measurement which is necessary for the controller 14; a sensor 22, advantageously an electrochemical or optical sensor, for determining the concentration of the reduction substance R an d furthermore sensors 23, advantageously electrochemical or optical sensors, for determining the concentration of NOx and HC are optionally present.

The combination of the non-thermal normal-pressure gas discharge with the selective catalytic reduction (SCR) therefore proves a considerable improvement for the practice of exhaust-gas cleaning, for which purpose in summary reference is again made to FIG. 9. From the sum of the results for SCR without plasma activation according to curve 91 and the results for plasma treatment alone according to curve 92 it follows that the successful treatment which was achieved in combination according to curve 94 is not due to the simple additive superimposition of two No decomposition measures according to curve 93. In fact, only the process which is described above in particular, with plasma activation which takes place with separation in terms of spatial and chronological terms, leads to a strengthening of the catalytic decomposition.

We claim:

1. A method for removing oxidic noxious substances in an exhaust gas containing oxygen, which comprises:

pretreating, initially, the exhaust gas containing the oxidic noxious substances including nitrogen monoxide in a non-thermal normal-pressure gas discharge in which the nitrogen monoxide is oxidized forming nitrogen dioxide and a degree of oxidation of the nitrogen monoxide to form the nitrogen dioxide being held below 50%; and performing, subsequently, a selective catalytic reduction of the oxidic noxious substances with an addition of ammonia functioning as a reduction agent and resulting in water and nitrogen as reaction products.

2. The method according to claim 1, which comprises using a dielectric barrier discharge as the non-thermal normal-pressure gas discharge.

3. The method according to claim 1, which comprises using a corona discharge including a pulsed discharge and a D.C. corona discharge as the non-thermal normal-pressure gas discharge.

4. The method according to claim 1, which comprises using a pulsed glow discharge as the non-thermal normal-pressure gas discharge.

5. The method according to claim 1, which comprises one of adding hydrocarbons in the exhaust gas and controlling a combustion process forming the hydrocarbons in the exhaust gas for reducing the energy requirements for oxidizing the nitrogen monoxide in the non-thermal normal-pressure gas discharge as compared to the energy requirements for oxidation without additives.

6. The method according to claim 5, which comprises controlling the degree of oxidation of the nitrogen monoxide to form the nitrogen dioxide by controlling an amount of power made available to the non-thermal normal-pressure gas discharge, in dependence on exhaust-gas parameters including a mass flow of the oxidic noxious substances and a mass flow of the hydrocarbons in the exhaust-gas, and on a mean temperature of a catalytic converter performing the selective catalytic reduction.

7. The method according to claim 6, which comprises performing the method steps for cleaning the exhaust gas of an internal combustion engine and determining the exhaust-gas parameters by reference to a characteristic diagram of the internal combustion engine.

8. The method according to claim 1, which comprises starting a treatment of the exhaust gas at temperatures which lie below temperatures at which catalytic processes start without plasma pretreatment.

9. The method according to claim 8, which comprises setting gas discharge operations of the non-thermal normal-pressure gas discharge at temperatures which lie above a threshold temperature for the catalytic processes to be used, without the plasma pretreatment.

10. The method according to claim 8, which comprises using a catalytic converter for performing selective catalytic reduction without plasma pretreatment, and operating the non-thermal normal-pressure gas discharge both for temperatures below and above the threshold temperature for the catalytic processes to be used, without the plasma pretreatment.

11. The method according to claim 8, which comprises cooling the exhaust gas for increasing an effective range of an exhaust-gas cleaning process, a temperature of the cooling lying above a maximum temperature for the catalytic reduction process.

12. The method according to claim 1, which comprises performing the pretreating and performing steps for cleaning the exhaust gas of an apparatus selected from the group consisting of internal combustion engines, diesel engines and machines operating powered by fossil fuels.

13. A device for treating an exhaust gas of an engine including internal-combustion engines, diesel engines and other engines operating with fossil fuels, comprising:

a series circuit formed of a first module having a gas discharge section and a second module having a catalytic converter and disposed downstream of said first module, said series circuit initially pretreating the exhaust gas containing hydrocarbons and oxidic noxious substances including nitrogen monoxide in said gas discharge section via a non-thermal normal-pressure gas discharge such that the nitrogen monoxide is oxidized forming nitrogen dioxide and a degree of oxidation of the nitrogen monoxide to form the nitrogen dioxide being held below 50%; and a controller for controlling an addition of a reduction agent in dependence on a mass flow of the oxidic noxious substances in the exhaust gas, a mass flow of the hydrocarbons in the exhaust gas, a mean temperature of said catalytic converter, and on an amount of power supplied to said gas discharge section, said catalytic converter performing a selective catalytic reduction of the oxidic noxious substances in the exhaust gas resulting in water and nitrogen as reaction products.

14. The device according to claimed in claim 13, wherein said series circuit is a plurality of series circuits each formed of said first module and said second module and said plurality of series circuits being disposed alternately one behind the other.

15. The device according to claim 13, wherein the reduction agent is fed to the exhaust gas at a point at which a reducing effect is at a maximum and a slip of the reduction agent is at a minimum.

16. The device according to claim 15, wherein said reduction agent is fed to the exhaust gas at least upstream of said gas discharge section so that said reduction agent is activated by said non-thermal normal-pressure gas discharge.

17. The device according to claim 15, wherein said reduction agent is added downstream of said gas discharge section if activation by said non-thermal normal-pressure gas discharge does not provide any benefit.

18. The device according to claim 15, including a further catalytic converter for pretreating the reduction agent and a device for the injection of the pre-treating reducing agent into the exhaust gas upstream of said gas discharge section.

19. The device according to claim 15, including a further catalytic converter for pretreating the reduction agent and a device for the injection of the pre-treating reducing agent into the exhaust gas upstream downstream of said gas discharge section.

20. The device according to claim 15, including:
   a feedline for conducting the exhaust gas to said gas discharge section; and
   a further catalytic converter disposed in said feedline for pretreating the reduction agent.

21. The device according to claim 13, including a sensor connected to said controller for measuring a quantity of unconsumed reduction agent and controlling a slip of the reduction agent.

22. The device according to claim 21, wherein said sensor is disposed downstream of said catalytic converter and is selected from the group consisting of optical sensors and electrochemical sensors.

23. The device according to claim 13, including a control unit connected to said gas discharge section for controlling the power supplied to said gas discharge section in dependence on the mass flow of the oxidic noxious substances in the exhaust gas, the mass flow of the hydrocarbons in the exhaust gas, and the mean temperature of said catalytic converter.

24. The device according to claim 23, including an engine controller having a memory storing characteristic maps of the engine, the mass flow of the oxidic noxious substances in the exhaust gas and the mass flow of the hydrocarbons in the exhaust gas being obtained from said characteristic maps.

25. The device according to claim 23, including:
   an engine controller having a memory storing characteristic maps of the engine, a mass flow of the exhaust gas being obtained from said characteristic maps, said engine controller outputting exhaust gas mass flow data; and
   further sensors selected from the group consisting of optical sensors and electrochemical sensors for measuring a concentration of the oxidic noxious substances and the hydrocarbons in the exhaust gas and outputting sensor signals, said sensor signals and the exhaust gas mass flow data being further processed together.

26. The device according to claim 23, wherein said mean temperature of said catalytic converter is measured electrically.

27. In combination with an engine, including a diesel engine, a device for treating an exhaust gas of the engine, the device comprising:
   a series circuit formed of a first module having a gas discharge section and a second module having a catalytic converter, said series circuit initially pretreating the exhaust gas containing hydrocarbons and oxidic noxious substances including nitrogen monoxide in said gas discharge section via a non-thermal normal-pressure gas discharge such that the nitrogen monoxide is oxidized forming nitrogen dioxide and a degree of oxidation of the nitrogen monoxide to form the nitrogen dioxide being held below 50%;
   a reduction agent controller for controlling an addition of a reduction substance in dependence on a mass flow of the oxidic noxious substances in the exhaust gas, a mass flow of the hydrocarbons in the exhaust gas, a mean temperature of said catalytic converter, and on an amount of power supplied to said gas discharge section, said catalytic converter performing a selective catalytic reduction of the oxidic noxious agent resulting in water and nitrogen as reaction products;
   an engine controller for controlling engine operations; and
   a gas discharge controller for controlling said gas discharge section and connected to said engine controller and said reduction agent controller.

* * * * *